United States Patent
St. John et al.

[19]

[11] Patent Number: 6,010,030
[45] Date of Patent: Jan. 4, 2000

[54] METAL CONTAINER

[75] Inventors: Robert A. St. John, Cheshire, Conn.; Wong Man Bun, Mong Kok, The Hong Kong Special Administrative Region of the People's Republic of China

[73] Assignee: HP Intellectual Corp., Wilmington, Del.

[21] Appl. No.: 09/058,244

[22] Filed: Apr. 10, 1998

[51] Int. Cl.[7] .......................... B65D 25/28; A47B 95/02
[52] U.S. Cl. ...................... 220/752; 16/110 A; 16/110 R; 16/116 R; 190/117; 220/573.1; 220/753; 220/912
[58] Field of Search ...................... 220/741, 742, 220/752, 755, 753, 759, 912, 573.1; 16/110 A, 114 A, 116 R, 114 R, 110 R, 421, 431, 444; 190/117

[56] References Cited

U.S. PATENT DOCUMENTS

| | | | |
|---|---|---|---|
| 420,917 | 2/1890 | McIntire | 220/912 X |
| 1,554,261 | 9/1925 | Dahmen | 220/912 X |
| 1,637,853 | 8/1927 | Brown . | |
| 1,730,820 | 10/1929 | Holden . | |
| 2,057,096 | 10/1936 | Haber . | |
| 2,146,415 | 2/1939 | Bradley | 16/114 R X |
| 2,155,810 | 4/1939 | Tinnerman . | |
| 2,398,436 | 4/1946 | Mason | 190/117 X |
| 2,998,169 | 8/1961 | Fischer . | |
| 3,531,822 | 10/1970 | Bush | 16/110 R |
| 3,616,964 | 11/1971 | Yamazaki . | |
| 3,716,433 | 2/1973 | Plummer | 16/110 R X |
| 3,813,729 | 6/1974 | Szabo et al. . | |
| 3,977,054 | 8/1976 | Moore et al. | 16/110 R X |
| 4,837,892 | 6/1989 | Lo . | |
| 5,097,566 | 3/1992 | Decker et al. | 16/114 R X |
| 5,135,128 | 8/1992 | Kuhn | 220/912 X |
| 5,170,695 | 12/1992 | Chang | 220/912 X |
| 5,216,780 | 6/1993 | Lutzke et al. . | |
| 5,584,414 | 12/1996 | Nubeck | 220/912 X |
| 5,640,741 | 6/1997 | Yano | 16/114 R |
| 5,826,340 | 10/1998 | Hull | 30/161 |

FOREIGN PATENT DOCUMENTS 5115381  5/1993  Japan .................... 220/912

*Primary Examiner*—Allan N. Shoap
*Assistant Examiner*—Joe Merek
*Attorney, Agent, or Firm*—Barry E. Deutsch

[57] ABSTRACT

A metal container 30 includes a container portion 34 and a handle 44. The container portion 34 is formed with a base floor 36, a side wall 38 and an opening 40 surrounded by an edge 42. The handle 44 is formed by two shell sections 64 and 66 which are assembled and secured, mechanically and adhesively, to form the handle. Soft, non-slip attachments 130 are secured to an inboard side of the exterior of the handle 44. Brackets 46 and 50 are secured to a side wall 38 of the container portion 34 and provide for threaded attachment of opposite ends of the handle 44 with the container portion of the container 30.

7 Claims, 5 Drawing Sheets

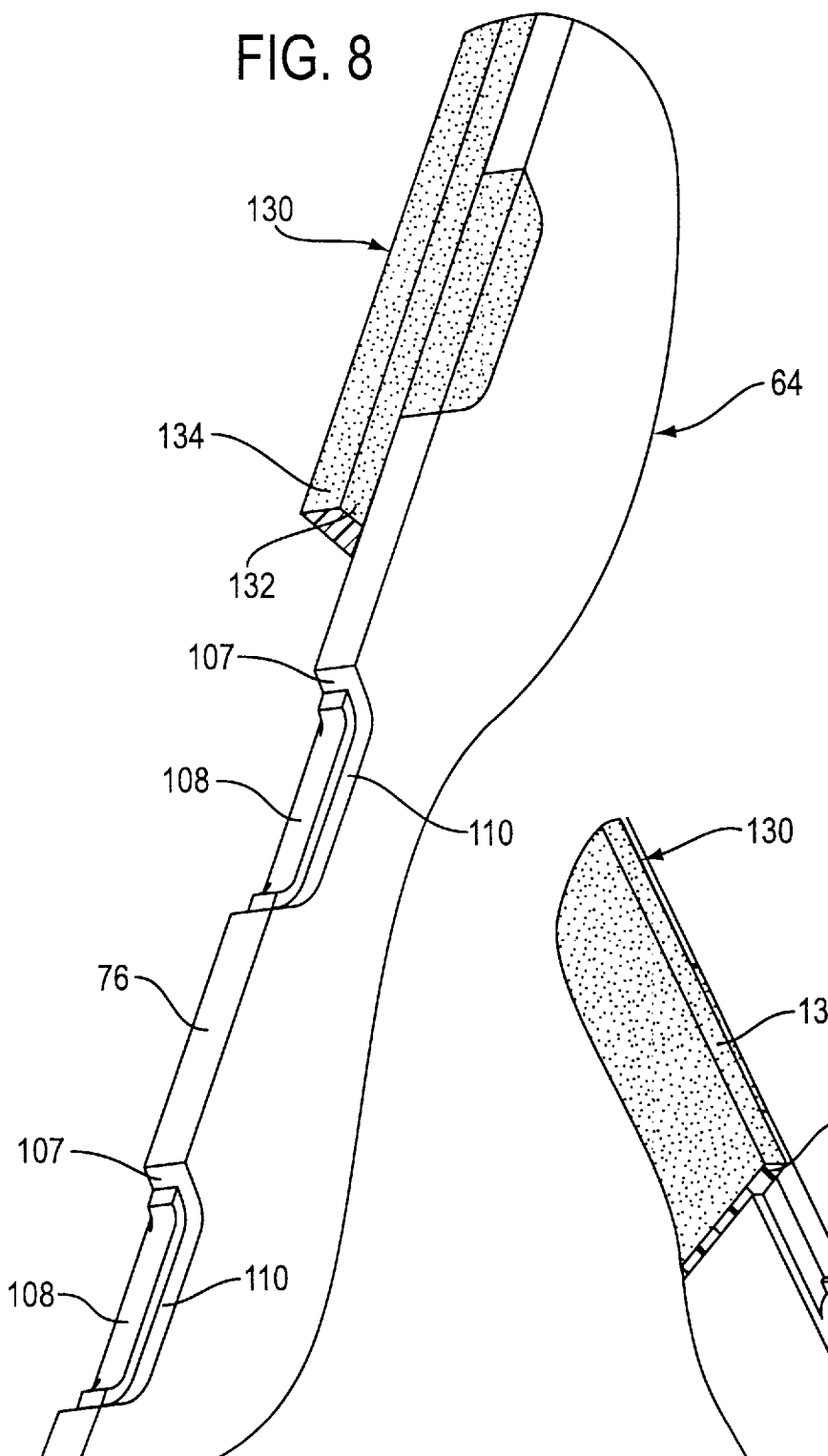

METAL CONTAINER

BACKGROUND OF THE INVENTION

This invention relates to a metal container, and particularly relates to a metal container with a handle such as, for example, a blender jar.

A blender is used to blend food ingredients into a desired state and consistency. The blender typically includes a housing with a motor for driving a blending implement usually at the inner base of a blender jar or container. The jar is typically removable from the housing of the blender to facilitate transport of the jar to and from another station independently of the housing.

There are many styles and designs of blender jars available in the marketplace. One type of jar is composed of a metal such as, for example, steel and, in some instances, does not include a handle which could lead to the jar slipping from the grasp of the user. In those instances where a handle is included, the facility used to mount the handle to the metal jar frequently does not have sufficient endurance and integrity to sustain constant and frequent usage and eventually loosens and becomes detached. Also, the handles used with metal jars have, at times, been of such a consistency that the handle tends to slip from the grasp of the user. Further, in some instances, the gripping portion of the handles have not been formed with sufficient structure to permit a full grip by the user of the jar.

As a consequence, there is a need for a metal jar which includes a handle firmly attached to the container portion of the jar which is easy to grasp. There is also a need for a metal jar with a handle which includes a gripping structure having a non-slip surface over at least a portion thereof which enhances the users ability to firmly hold the jar without concern for the jar handle slipping from the user's grasp.

SUMMARY OF THE INVENTION

Therefore, it is an object of this invention to provide a metal container having facility for the handling thereof without concern that the container will slip from the grasp of a user thereof.

Another object of this invention is to provide a metal container having a handle which is firmly attached to a container portion thereof to facilitate transport and handling of the container.

Still another object of this invention is to provide a metal container having a handle which enhances a user's ability to grasp the handle firmly.

With these and other objects in mind, this invention contemplates a metal container which includes a container portion formed with a side wall, a base floor at a first end and an opening at a second end. A mount is formed with a first leg and a second leg spaced from the first leg, and is secured to the side wall of the container portion with the first leg and the second leg extending outward from the container portion. A handle is formed with a tab concealed within the handle. The handle is positioned over, and conceals, the secured mount, with the tab of the handle being located between the first leg and the second leg of the mount. A means is provided for securing the tab to the mount.

This invention further contemplates a metal container includes a container portion and a handle attached to the container portion. A non-slip cover is self-secured to the handle.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 8 is a perspective view showing a portion of an edge of one of the handle sections of FIG. 7 in accordance with certain principles of the invention; and FIG. 9 is a perspective view showing an opposite side of the edge of the one section of FIG. 8 in accordance with certain principles of the invention.

DETAILED DESCRIPTION OF THE PREFERRED EMBODIMENTS OF THE INVENTION

Figure 1:
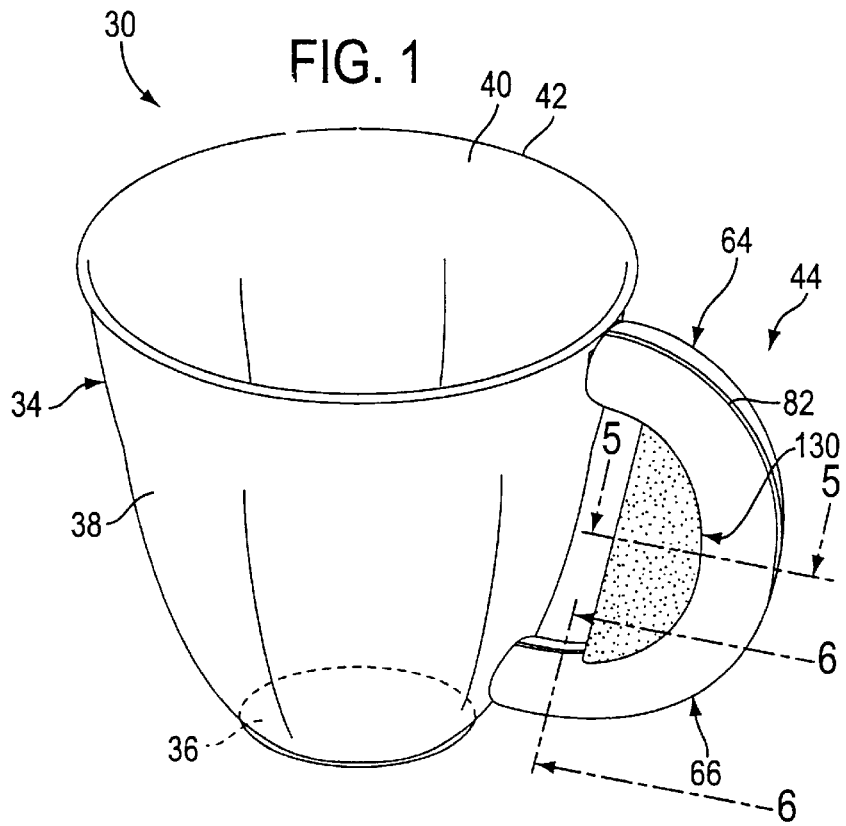
FIG. 1 is a perspective view showing a metal container with a handle in accordance with certain principles of the invention.

Referring to FIG. 1, a metal container or jar 30 is formed with a container portion 34 having a base floor 36, a side wall 38 and an opening 40 at a top edge 42 thereof. The container 30 also includes a handle 44 attached to outer portions of the side wall 38. The base floor 36 is circular at a prescribed diameter, and the top edge 42 is also circular at a diameter greater than the prescribed diameter. The side wall 38 extends from the base floor 36 to the top edge 42 of the container 30 and flares radially outward therebetween.

Figure 2:
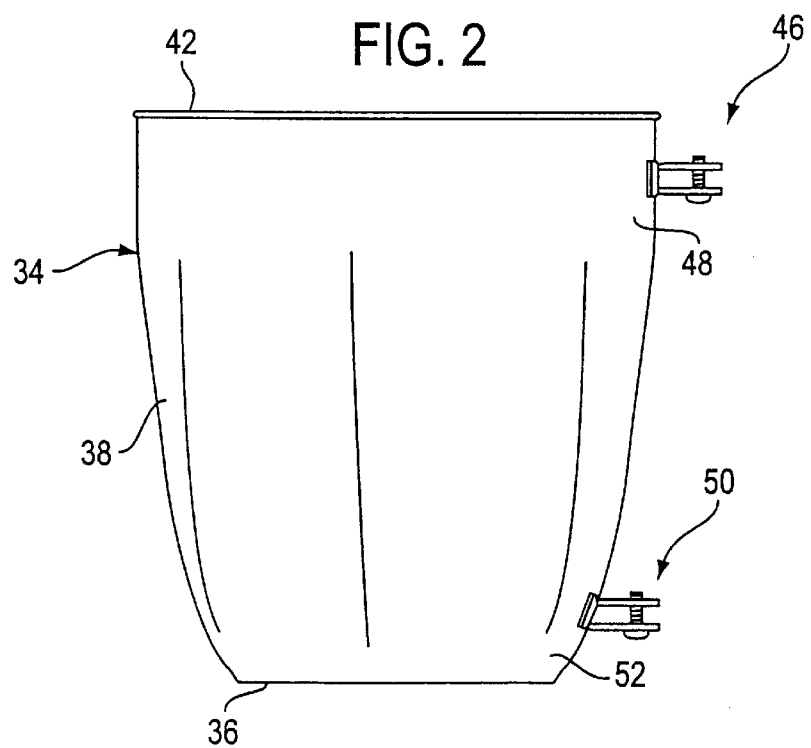
FIG. 2 is a side view showing a container portion of the container of FIG. 1 with handle-attachment brackets attached to the container portion in accordance with certain principles of the invention.

As shown in FIG. 2, an upper bracket 46 is secured to an upper surface 48 of the side wall 38 of the container portion 34, and a lower bracket 50 is secured to a lower surface 52 of the side wall. The brackets 46 and 50 may be secured to the side wall 38 by use of any known technique such as, for example, brazing.

Figure 3:
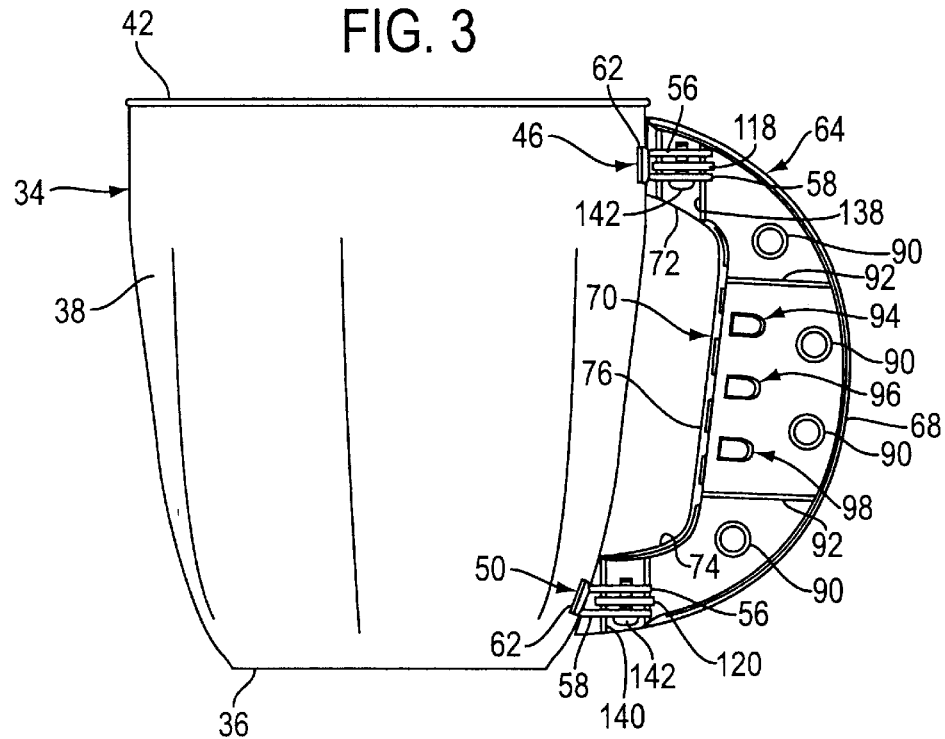
FIG. 3 is a side view showing the container and handle of FIG. 1 with portions of the handle removed to show elements thereof in accordance with certain principles of the invention.
Figure 4:
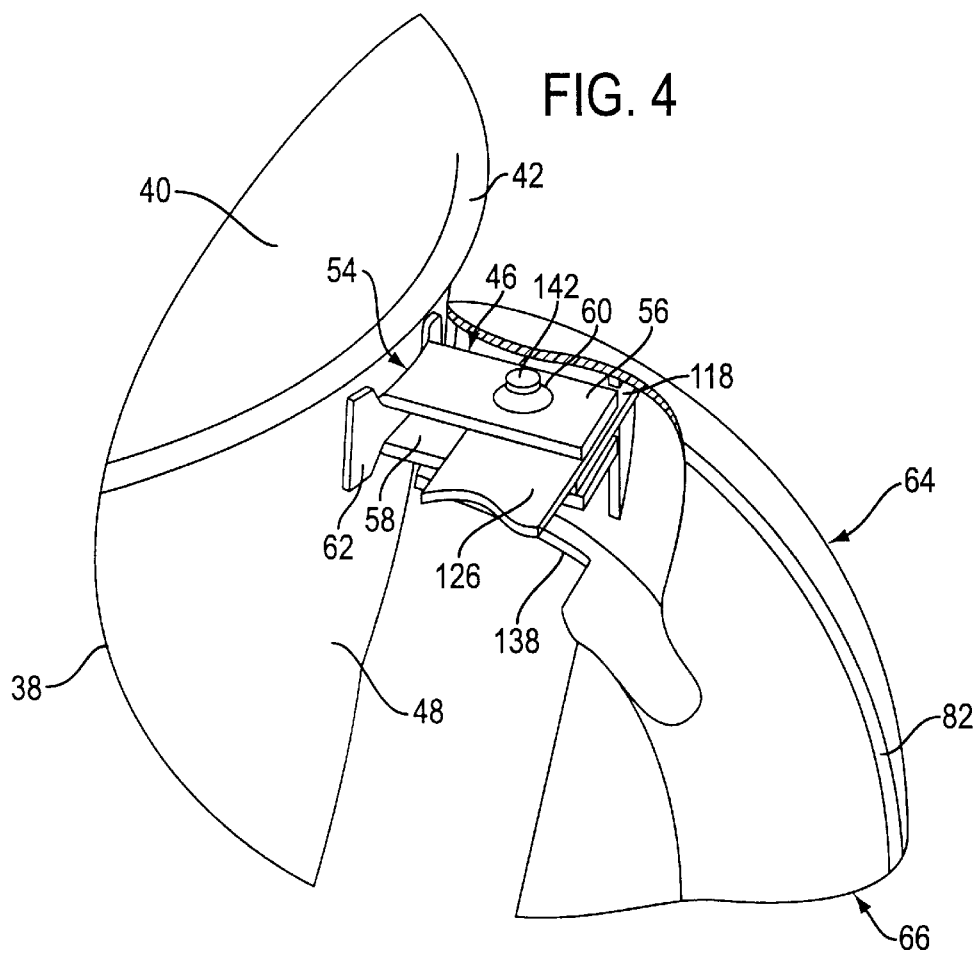
FIG. 4 is a sectional view of a portion of the metal container of FIG. 1 showing interior features of the handle attached to the brackets of FIG. 2 in accordance with certain principles of the invention.

Referring to FIG. 4, the upper bracket 46 includes a "U" shaped metal mount 54 having a base, with an upper leg 56 and a spaced lower leg 58 extending from opposite sides of the base. The lower leg 58 is formed with a threadless hole which is aligned with a threaded hole 60 formed in the upper leg 56. A metal strap 62 is located over the inner surface of the base and extends from opposite sides thereof. The assembled strap 62 and the outer surface of the base of the mount 54 are placed in position with the upper surface 48 of the container portion 38, and are secured thereto, for example, by brazing. The lower bracket 50 includes the same structural elements as the upper bracket 46 and is oriented slightly differently to accommodate the curvature of the surface 52, as shown in FIGS. 2 and 3, when the lower bracket is secured to the container portion 38.

Figure 7:
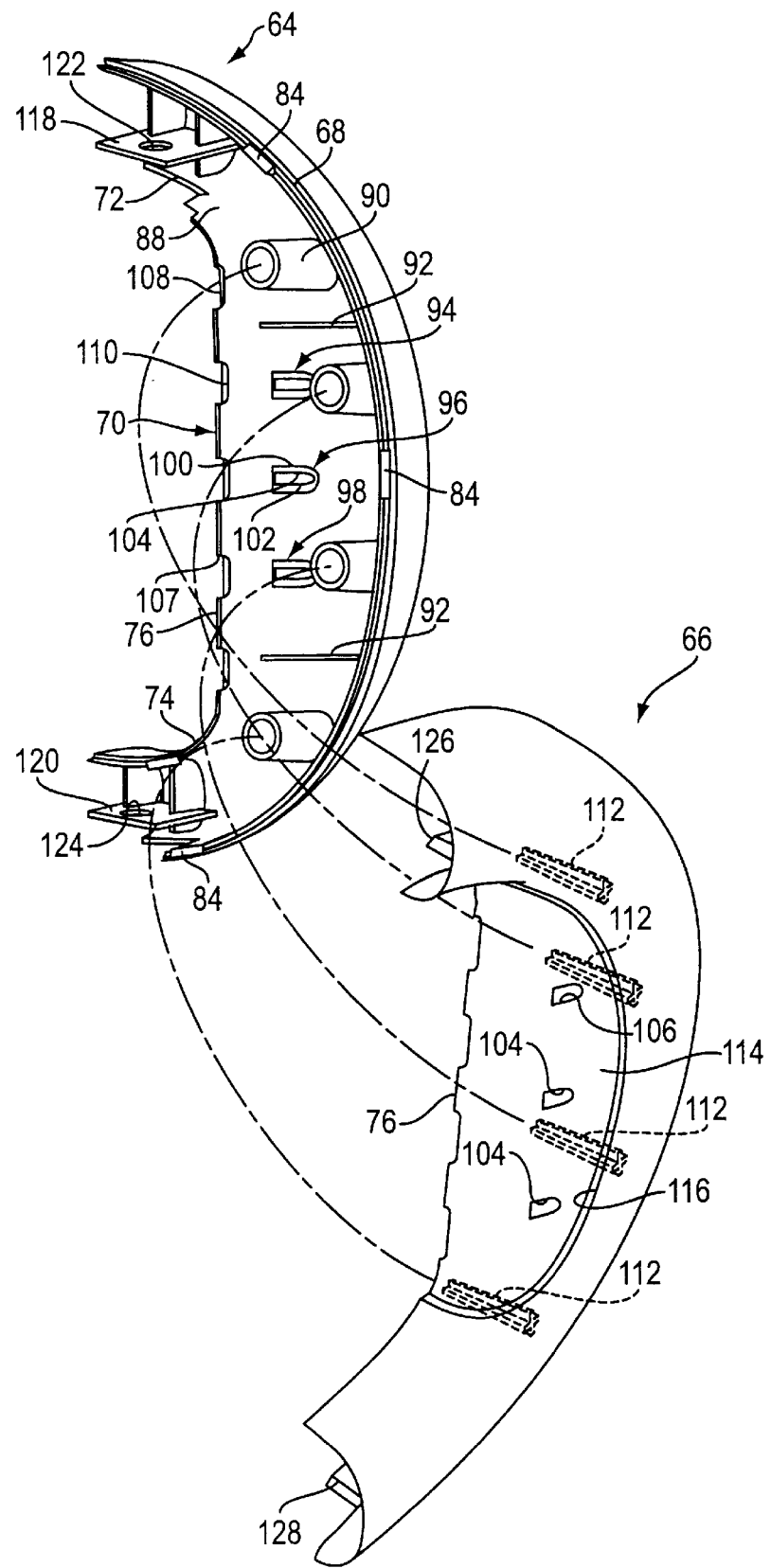
FIG. 7 is an exploded perspective view showing two sections which form the handle of FIG. 1 in accordance with certain principles of the invention.

As illustrated in FIG. 7, the handle 44 includes two half shell sections 64 and 66. As shown in FIGS. 1, 3 and 7, the sections 64 and 66 are formed in a curving end-to-end configuration, and are composed of a durable plastic material such as, for example, polycarbonate.

It is noted that the section 66 is formed with structural features essentially the same as the structural features of the section 64 except where specific differences are noted below. The common features of the sections 64 and 66 will be described with respect to the section 64, it being understood that the section 66 also includes the common features.

Figure 5:
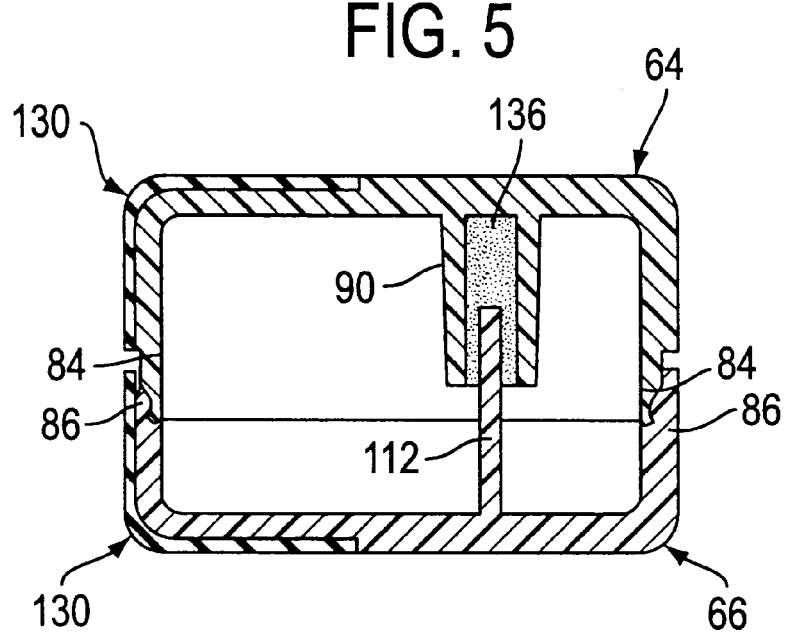
FIG. 5 is a sectional view taken along line 5—5 of the handle of FIG. 1 showing interior features of the handle in accordance with certain principles of the invention.
Figure 6:
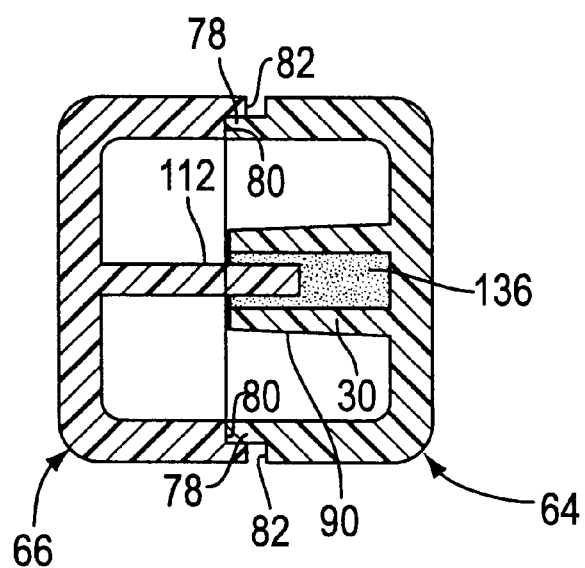
FIG. 6 is a sectional view taken along line 6—6 of the handle of FIG. 1 showing interior features of the handle in accordance with certain principles of the invention.

As shown in FIG. 4, each of the sections 64 and 66 is formed generally with a "U" shaped cross section taken laterally along its length. As shown in FIG. 3, the section 64 is formed with a concave outboard edge 68, and an inboard edge 70 which is formed by two curved portions 72 and 74 at opposite ends of a straight intermediate portion 76. The straight intermediate portion 76 is formed in the manner of a chord extending across a circular portion, represented by the curved portions 72 and 74. Referring to FIG. 6, stepped rims 78 are formed along the edge 68 and along the curved portions 72 and 74 of the section 64, while the section 66 is formed with inboard stepped grooves 80 along corresponding edges thereof in a shape complementary to the shape of the rims 78. When the sections 64 and 66 are assembled, the rims 78 will locate in the grooves 80 to conceal the actual interfacing juncture of the sections and form an attractive seam 82. Referring to FIG. 5, the sections 64 and 66 are also formed with a plurality of biased snap fingers 84 and 86, respectively, which are spatially located along the respective edges thereof to interlock or latch when the sections are assembled together.

As shown in FIG. 7, the half section 64 is formed with an open channel 88 and four spaced cylindrical stacks 90 which extend outward from the base of the channel. A pair of spaced support walls 92 (FIG. 3) extend across the shell of the channel 88. An inside portion of the section 64 is formed with a plurality of troughs 94, 96 and 98, each of which include a pair of spaced sloping surfaces 100 and 102 on opposite sides of a through hole 104 formed through the section 64. The through holes 104 communicate with the outer surfaces of the sections 64 and 66, as illustrated with respect to the section 66.

As shown in FIGS. 7 and 8, the straight edge portion 76 is formed with a plurality of spaced notches 107, each having a raised platform 108 toward the outboard surface of the section 64 and a recessed ledge 110 on the inboard side of the platform. Referring to FIG. 7, the section 66 is formed with four spaced posts 112 which extend outward from a channel thereof, and are located to be inserted into the stacks 90 of the section 64 when the sections are assembled together. Also, as shown with respect to the section 66, each of the sections 64 and 66 are formed with a recessed surface 114 bordered by the straight edge portion 76 and an intermediate curved shoulder 116.

As shown in FIG. 7, the section 64 is formed with a pair of spaced tabs 118 and 120 which are formed with holes 122 and 124, respectively, and which are located at opposite ends of the channel 88. The section 66 is formed with corresponding tabs 126 and 128, also having respective holes formed therethrough.

Referring to FIGS. 8 and 9, the section 64 is placed in a mold which forms a cavity about the recessed surface 114 and along the straight edge portion 76. A plastic, in a liquid state, is deposited into the cavity and flows onto the recessed surface 114, through the openings 104 of the troughs 94, 96 and 98, and over the platform 108 of the notches 107. The plastic then flows onto the sloping surfaces 100 and 102, and the ledges 110. When the plastic is cured, it forms an attachment 130 generally outboard of the recessed surface 114 and is retained with the section 64 by the portions of the plastic which flowed onto the sloping surfaces 100 and 102, and the ledge 110. A plastic noted for its non-slip properties is available under the trade name "ALCRYN" from DuPont and can be used to form the attachment 130. During the molding process, the surface melt between the polycarbonate sections 64 and 66 and the liquid plastic which forms the attachments 130 develops a bonding therebetween which enhances the retention of the attachments to the sections. The formed attachments 130 provide an excellent soft-type, non-slip, handle grip which has a long life cycle.

As shown in FIGS. 8 and 9, the cavity of the mold facilitates the formation of a portion 132 of the attachment 130 which extends above the straight edge portion 76, and which is formed with an outer edge 134. When the sections 64 and 66 are assembled together, the edges 134 of the attachments 130 firmly engage to form a near-seamless juncture.

Referring to FIGS. 5 and 6, prior to assembling the sections 64 and 66 together, a silicone adhesive is deposited onto each of the posts 112, and/or into the openings of the stacks 90. After the sections 64 and 66 have been assembled, the silicone adhesive will cure and form a cured adhesive 136 which further locks or latches the sections together to form the handle 44.

Referring to FIGS. 3 and 4, after the sections 64 and 66 have been assembled together, the handle 44 is manipulated to position the tabs 118, 120 and 126, 128 of each section between the legs 56 and 58 of the brackets 46 and 50. By observing through a pair of openings 138 and 140 formed in undersurfaces at opposite ends of the handle 44, the openings of the legs 56 and 58, and the openings of the tabs are aligned. Thereafter, a pair of threaded fasteners 142 are inserted into the openings 138 and 140, through the openings of the leg 58 and the tabs, and into the threaded opening 60 of the leg 56 to firmly attach the handle 44 to the container portion 34 and thereby complete the formation of the metal container 30.

As described above, the container 30 includes the metal container portion 34 and the handle 44. The handle 44 is securely and firmly attached to the container portion 34 and includes the non-slip attachments 130. The container 30, with these features, is easy to grasp and transport without concern for slipping from the grasp of the user. Also, the external portion of the handle 44 which is formed by middle portions of the sections 64 and 66, and the portion which includes the non-slip attachments 130, provide a large structure for placement of the user's hand. With this structure, the fingers of the user's hand locate over the non-slip attachment 130 and the palm of the user's hand locates over the outboard surfaces of the middle portions of the sections 64 and 66. With such a large structure to grip, the user's grip of the handle 44 is enhanced during transport and handling of the metal container 30.

In general, the above-identified embodiments are not to be construed as limiting the breadth of the present invention. Modifications, and other alternative constructions, will be apparent which are within the spirit and scope of the invention as defined in the appended claims.

What is claimed is:

1. A metal container, which comprises:

a container portion formed with a side wall, a base floor at a first end and an opening at a second end;

a mount formed with a first leg and a second leg spaced from the first leg;

the mount being secured to the side wall of the container portion with the first leg and the second leg extending outward from the container portion;

a handle being formed in two sections which are joined to form the handle; each of the handle sections being formed with a tab;

the handle positioned over, and concealing, the secured mount and the tabs;

the tabs of the handle being located between the first leg and the second leg of the mount such that one tab overlaps the other tab;

means for securing the tab to the mount;

a non-slip cover self-secured to the handle;

the handle being formed with a wall having an outer surface and a recessed surface;

the wall having at least one opening extending therethrough communicating the outer surface with the recessed surface; and the non-slip cover being formed with a portion covering at least a segment of the outer surface of the wall, with first further portions extending through the opening of the wall, and with second further portions covering the recessed surface, the first and second further portions self-secure the non-slip cover to the handle.

2. The metal container as set forth in claim 1, wherein the mount further comprises:

a base leg joined with the first leg and the second leg at opposed ends thereof.

3. The metal container as set forth in claim 2, wherein the mount is formed in a "U" shape.

4. The metal container as set forth in claim 2, which further comprises:

a strap having a first section located over an inboard surface of the base leg of the mount;

the base leg having an outboard surface in engagement with the side wall of the container portion; and a second section of the strap located over and secured to the side wall of the container portion.

5. The metal container as set forth in claim 1, which further comprises:

the structure of one of the two sections being assembled with the structure of the other of the two sections; and a cured adhesive located between at least portions of the assembled structures of the two sections to assist in securing the sections together.

6. The metal container as set forth in claim 1, wherein the mount is a first mount and which further comprises:

a second mount secured to the side wall of the container portion at a location spaced from the first mount;

the handle formed with a first end and a second end spaced from the first end;

a first tab being formed within the handle at the first end thereof;

a second tab being formed within the handle at the second end thereof;

the first tab being located adjacent the first mount;

the second tab being located adjacent the second mount; and means for securing the first and second tabs to the first and second mounts, respectively.

7. The metal container as set forth in claim 1, which further comprises:

a non-slip cover attached to at least a portion of the handle.

* * * * *